United States Patent
Zhu et al.

(10) Patent No.: US 11,175,390 B2
(45) Date of Patent: Nov. 16, 2021

(54) REAL-TIME ESTIMATION OF DC BIAS AND NOISE POWER OF LIGHT DETECTION AND RANGING (LIDAR)

(71) Applicant: BEIJING VOYAGER TECHNOLOGY CO., LTD., Beijing (CN)

(72) Inventors: Zhenghan Zhu, Mountain View, CA (US); Yue Lu, Los Gatos, CA (US); Lingkai Kong, Palo Alto, CA (US); John Wu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 302 days.

(21) Appl. No.: 16/231,911

(22) Filed: Dec. 24, 2018

(65) Prior Publication Data

US 2020/0200884 A1    Jun. 25, 2020

(51) Int. Cl.
*G01S 7/497*     (2006.01)
*G01S 7/487*     (2006.01)
*G01S 17/02*     (2020.01)

(52) U.S. Cl.
CPC ............ *G01S 7/497* (2013.01); *G01S 7/4873* (2013.01); *G01S 17/02* (2013.01)

(58) Field of Classification Search
CPC ........ G01S 7/497; G01S 7/486; G01S 7/4861; G01S 7/4865; G01S 7/4912; G01S 7/4913
See application file for complete search history.

(56) References Cited

U.S. PATENT DOCUMENTS

| 9,151,831 | B2* | 10/2015 | Mase | G01S 7/4861 |
| 2004/0070745 | A1* | 4/2004 | Lewis | G01S 17/10 |
| | | | | 356/5.01 |
| 2005/0213074 | A1 | 9/2005 | Hoashi | |
| 2016/0047891 | A1* | 2/2016 | Campbell | G01S 7/352 |
| | | | | 702/150 |

(Continued)

OTHER PUBLICATIONS

Website https://www.analogictips.com/electrical-noise-introductory-concepts-faq/ retrieved on Apr. 6, 2021.*

(Continued)

*Primary Examiner* — Eric L Bolda
(74) *Attorney, Agent, or Firm* — Bayes PLLC

(57) ABSTRACT

Embodiments of the disclosure provide a system for analyzing noise data for light detection and ranging (LiDAR). The system includes a communication interface configured to sequentially receive noise data of the LiDAR in time windows, at least one storage device configured to store instructions, and at least one processor configured to execute the instructions to perform operations. Exemplary operations include determining an estimated noise value of a first time window using the noise data received in the first time window and determining an instant noise value of a second time window using the noise data received in the second time window. The second time window is immediately subsequent to the first time window. The operations also include determining an estimated noise value of the second time window by aggregating the estimated noise value of the first time window and the instant noise value of the second time window.

20 Claims, 7 Drawing Sheets

(56) References Cited

U.S. PATENT DOCUMENTS

2018/0120424 A1  5/2018 Eshel et al.
2018/0253404 A1* 9/2018 Moore ................ G06F 11/0703

OTHER PUBLICATIONS

International Search Report issued in corresponding International Application No. PCT/US2018/067574, dated Mar. 29, 2019, 3 pages.
Written Opinion of the International Searching Authority issued in corresponding International Application No. PCT/US2018/067574, dated Mar. 29, 2019, 4 pages.

* cited by examiner

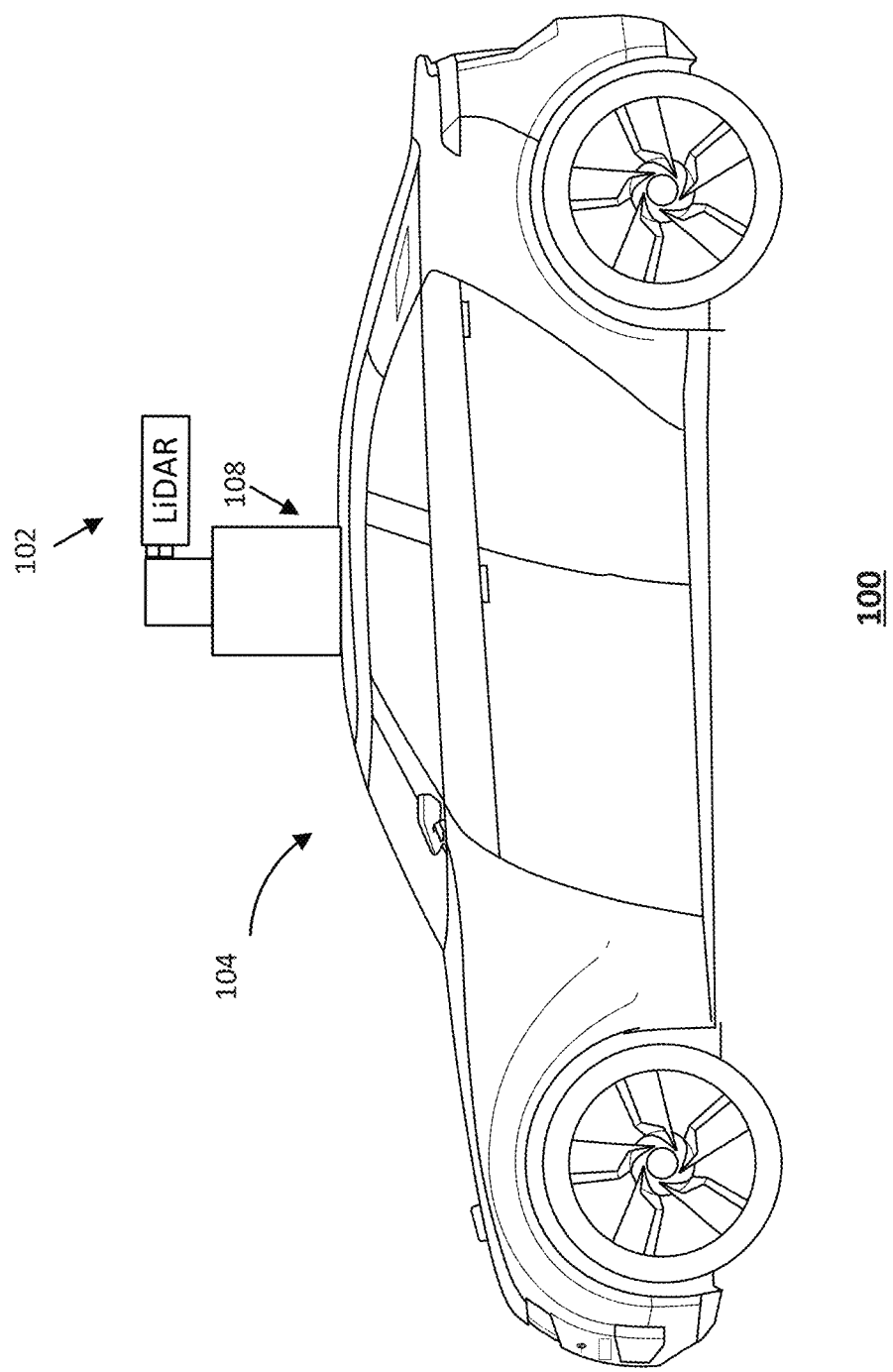

REAL-TIME ESTIMATION OF DC BIAS AND NOISE POWER OF LIGHT DETECTION AND RANGING (LIDAR)

TECHNICAL FIELD

The present disclosure relates to a Light Detection and Ranging (LiDAR) system, and more particularly to, a system and method for estimating the direct current (DC) bias and noise power of LiDAR.

BACKGROUND

LiDAR systems have been widely used in autonomous driving and advanced driver assistance system (ADAS)s and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

A LiDAR transmitter often transmits a signal (e.g., pulses of laser light) at a surface or into the surroundings, and a LiDAR receiver collects the returned signal (e.g., signal returned by an object in the surroundings). LiDAR can then calculate desired parameters such as the distance between the object and the vehicle based on, e.g., the speed of light and the time the signal travels (e.g., the duration of time between the time the signal is transmitted and the time the signal is received) and use the parameters to construct maps and/or models of the surroundings. However, the returned signal is coupled with noises, which may cause errors in detection. Therefore, real-time estimation of noise parameters is needed to improve LiDAR efficiency and accuracy.

Embodiments of the disclosure address the above problems by an improved noise estimation method for LiDAR.

SUMMARY

Embodiments of the disclosure provide a system for analyzing noise data for LiDAR. The system can include a communication interface configured to sequentially receive noise data of the LiDAR in a plurality of time windows, at least one storage device configured to store instructions, and at least one processor configured to execute the instructions to perform operations. The operations can include determining an estimated noise value of a first time window using the noise data received in the first time window and determining an instant noise value of a second time window using the noise data received in the second time window. The second time window can be immediately subsequent to the first time window. The operations can also include determining an estimated noise value of the second time window by aggregating the estimated noise value of the first time window and the instant noise value of the second time window.

Embodiments of the disclosure also provide a method for analyzing noise data for LiDAR. The method can include determining, by a processor, an estimated noise value of a first time window using noise data received by a receiver of the LiDAR in the first time window and determining, by the processor, an instant noise value of a second time window using noise data received by the receiver of the LiDAR in the second time window. The second time window can be immediately subsequent to the first time window. The method can also include determining, by the processor, an estimated noise value of the second time window by aggregating the estimated noise value of the first time window and the instant noise value of the second time window.

Embodiments of the disclosure also provide a non-transitory computer-readable medium having instructions stored thereon. When executed by at least one processor, the instructions can cause the at least one processor to perform a method for analyzing noise data for LiDAR. The method can include determining an estimated noise value of a first time window using noise data received in the first time window and determining an instant noise value of a second time window using noise data received in the second time window. The second time window can be immediately subsequent to the first time window. The method can also include determining an estimated noise value of the second time window by aggregating the estimated noise value of the first time window and the instant noise value of the second time window.

It is to be understood that both the foregoing general description and the following detailed description are exemplary and explanatory only and are not restrictive of the invention, as claimed.

BRIEF DESCRIPTION OF THE DRAWINGS

FIG. 1 illustrates a schematic diagram of an exemplary vehicle equipped with a LiDAR system, according to embodiments of the disclosure.

DETAILED DESCRIPTION

Figure 2A:
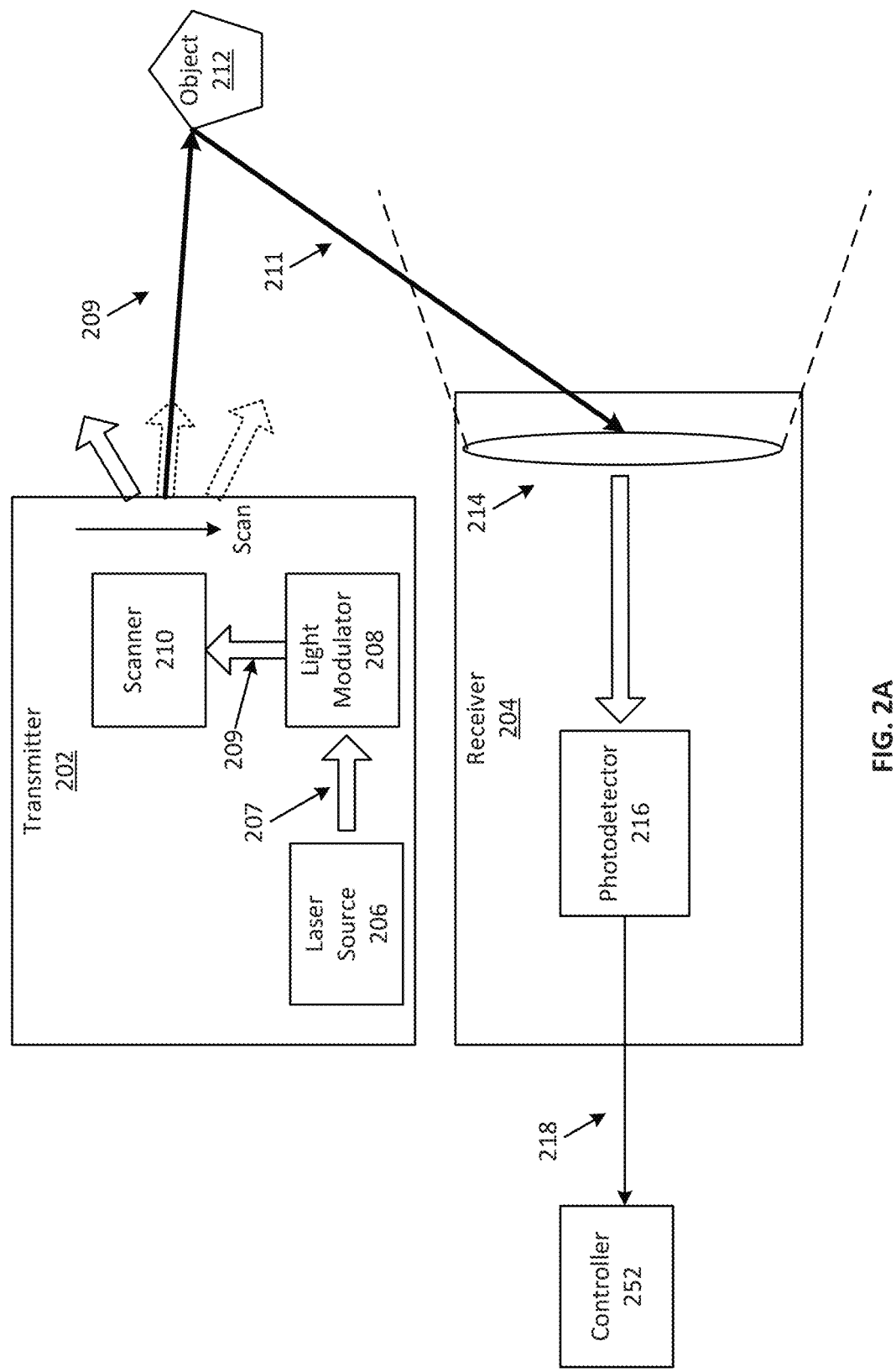
FIG. 2A illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring point cloud data for, e.g., constructing a high-definition map.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. It is contemplated that the manners in which LiDAR system 102 can be equipped on vehicle 100 are not limited by the example shown in FIG. 1 and may be modified depending on the types of LiDAR system 102 and/or vehicle 100 to achieve desirable 3-D sensing performance.

Consistent with some embodiments, LiDAR system 102 may be configured to capture data as vehicle 100 moves along a trajectory. For example, a transmitter of LiDAR system 102 is configured to scan the surrounding and acquire point clouds. LiDAR system 102 measures distant to a target by illuminating the target with pulsed laser light and measuring the reflected pulses with a receiver. The laser light used for LiDAR system 102 may be ultraviolet, visible or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

Consistent with the present disclosure, a controller may be included for processing and/or analyzing collected data for various operations such as analyzing the collected data. The controller may also communicate with a remote computing device, such as a server (or cloud) for operations of LiDAR system 102. Components of the controller may be in an integrated device or distributed at different locations but communicate with each other through a network (not shown). In some embodiments, the controller may be located entirely within LiDAR system 102. In some alternative embodiments, one or more components of the controller may be located in LiDAR system 102, inside vehicle 100, or may be alternatively in a mobile device, in the cloud, or another remote location.

In some embodiments, the controller may process the noise data locally. In some alternative embodiments, the controller is connected to a server for processing the noise data. For example, the controller may stream the collected noise data to the server for data processing and receive the processed data (e.g., the estimated DC bias/noise power) from the server. In some embodiments, the noise data may be processed and the DC bias/noise power may be estimated in real-time. A detection threshold may be updated based on the estimated DC bias/noise power.

FIG. 2A illustrates a block diagram of an exemplary LiDAR system 102, according to embodiments of the disclosure. LiDAR system 102 has a transmitter 202 for scanning a laser beam 209 and a receiver 204 for collecting data that includes noise data and a returned laser beam 211 reflected by an object 212. Transmitter 202 may include any suitable light source that emits laser beam 209 outwardly into the surroundings of vehicle 100. In some embodiments, laser beam 209 includes a pulsed laser signal with a scanning angle, as illustrated in FIG. 2.

Transmitter 202 may include any suitable components for generating laser beam 209 of a desired wavelength. For example, transmitter 202 may include a laser source 206 that generates a native laser beam 207 in the ultraviolet, visible, or near infrared wavelength range. Transmitter 202 may also include a light modulator 208 that collimates native laser beam 207 to generate laser beam 209. Scanner 210 can scan laser beam 209 at a desired scanning angle and a desired scanning rate. Laser beam 209 may be incident on an object 12, reflected back, and collected by receiver 214. Object 212 may be made of a wide range of materials including, for example, non-metallic objects, rocks, rain, chemical compounds, aerosols, clouds and even single molecules. The wavelength of laser beam 209 may vary based on the composition of object 212. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 (e.g., returned signals) returned from object 212. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2A, receiver 204 may include a lens 214 and a photodetector 216. Lens 214 may be configured to collect light from a respective direction in its field of view (FOV). At each time point during the scan, returned laser beam 211 may be collected by lens 214.

Photodetector 216 may be configured to detect returned laser beam 211 returned from object 212. Photodetector 216 may convert the laser light (e.g., returned laser beam 211) collected by lens 214 into a received signal 218 (e.g., a current or a voltage signal). The current is generated when photons are absorbed in the photodiode. Received signal 218 may be transmitted to a data processing unit, e.g., controller 252 of LiDAR system 102, to be processed and analyzed.

Received signal 218 may include noise data together with the detected returned laser beam 211. In other words, receiver 204 may also receive noise data (not shown in FIG. 2A) when measuring returned laser beam 211. The noise data may include any data (e.g., detected by receiver 204) other than returned laser beam 211. The noise data can be caused by the environment, such as background light and temperature and/or optical/electrical interference from other parts of vehicle 100 and any unwanted return signal from any reflective objects in the field. In an example, background light incident on photodetector 216 can contribute to the noise data and form DC bias. When vehicle 100 moves, the background light may change, resulting in a change of the DC bias (e.g., formed by the incidence of background light on photodetector 216). Thermal activities of electrons (e.g., of photodetector 216) can also contribute to the change of the DC bias. In some embodiments, a fast-changing environment may result in a fast-changing noise data (e.g., noise data that fluctuates at a higher frequency). In some embodiments, received signal 218 is transmitted to controller 252 of LiDAR system 102 to be processed in order to remove/reduce noise data from the returned laser beam 211, conditioning it for subsequent processing, such as distance measurement, models/map construction, etc.

Figure 2B:
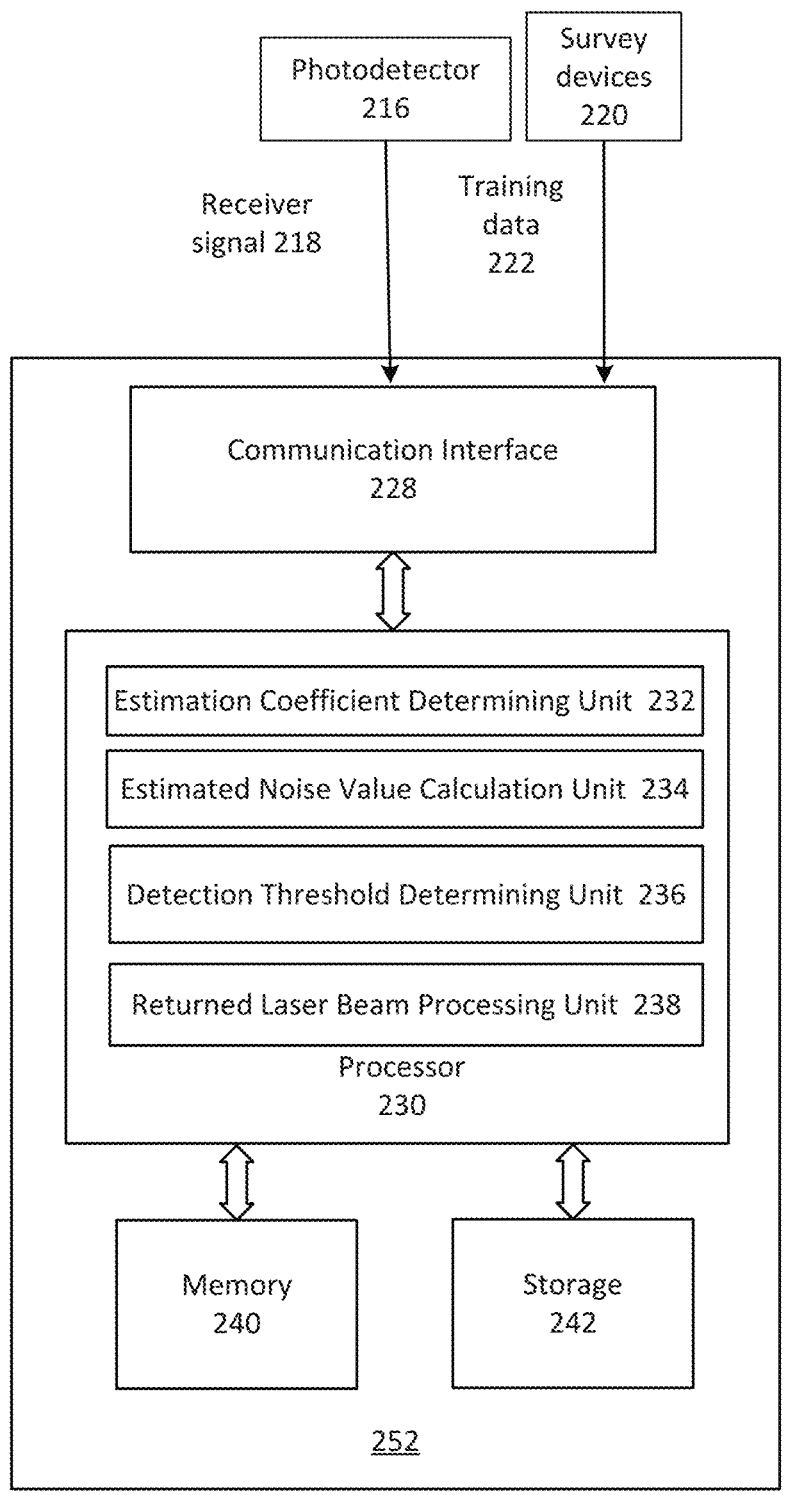
FIG. 2B illustrates a block diagram of an exemplary controller for calculating estimated DC bias and estimated noise power, according to embodiments of the disclosure.

FIG. 2B shows an exemplary controller 252, according to embodiments of the disclosure. Consistent with the present disclosure, controller 252 may receive received signal 218 (e.g., containing noise data/signal and returned laser beam signal/data) from photodetector 216 and receive training data 222 from one or more survey devices 220.

In some embodiments, as shown in FIG. 2B, controller 252 may include a communication interface 228, a processor 230, a memory 240, and a storage 242. In some embodiments, controller 252 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of controller 252 may be located in a cloud, or may be alternatively in a single location (such as inside vehicle 100 or a mobile device) or distributed locations. Components of controller 252 may be in an integrated device, or distributed at different locations but communicate with each other through a network (not shown).

Communication interface 228 may send data to and receive data from components such as photodetector 216 and/or survey devices 220 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 228 can be an integrated services digital network (ISDN) card, cable modem, satellite modem, or a modem to provide a data communication connection. As another example, communication interface 228 can be a local area network (LAN) card to provide a data communication connection to a compatible LAN. Wireless links can also be implemented by communication interface 228. In such an implementation, communication interface 228 can send and receive electrical, electromagnetic or optical signals that carry digital data streams representing various types of information via a network.

Consistent with some embodiments, communication interface 228 may receive received signal 218 (e.g., containing noise signal/data and returned laser beam signal/data). In some embodiments, communication interface 228 may sequentially receive the noise data in multiple time windows. For example, communication interface 228 may receive noise data in a first time window. After a certain time period, as noise data in the second time window becomes available, communication interface 228 may then receive noise data in the second time window. The length of the time window may be preset prior to the application of the LiDAR, or dramatically/adaptively determined during the application of the LiDAR, based on, e.g., the environment the LiDAR is being used in. For a noisy environment, the length of the time window may be set shorter so that noise estimation is carried out more frequently.

In some embodiments, communication interface 228 may further receive training data 222 from survey devices 220. Training data 222 may include any suitable simulation data used for determining the values of a bias estimation coefficient and/or a power estimation coefficient used in determining the estimated DC bias and/or estimated noise power (described as follows). Training data 222 may be collected by survey devices 220, such as a survey vehicle and/or generated by a device (e.g., a processor), and may contain data that reflects a correlation between the bias estimation coefficient/power estimation coefficient and the environment. Communication interface 228 may further provide the received received signal 218 and training data 222 for storage or to processor 230 for processing.

Processor 230 may include any appropriate type of general-purpose or special-purpose microprocessor, digital signal processor, or microcontroller. Processor 230 may be configured as a stand-alone processor module dedicated to analyzing signals (e.g., noise data). Alternatively, processor 230 may be configured as a shared processor module for performing other functions unrelated to signals analysis.

As shown in FIG. 2B, processor 230 may include multiple modules, such as an estimation coefficient determining unit 232, an estimated noise value calculation unit 234, a detection threshold determining unit 236, a returned laser beam processing unit 238, and the like. Estimation coefficient determining unit 232 may be configured to determine the bias estimation coefficient and/or the power estimation coefficient respectively used for estimating DC bias and noise power based on, e.g., training data 222. Any suitable methods (e.g., algorithms) may be used to extract these coefficients from training data 222. For example, the training data may include fast-changing data (e.g., data of high fluctuation frequency) and slow-changing data (e.g., data of low fluctuation frequency), respectively corresponding to a fast-changing environment and a slow-changing environment. Methods such as machine learning and/or linear regression may be applied on the training data to determine bias estimation coefficient/power estimation coefficient that reflect the fast-changing environment and the slow-changing environment. In an example, a large bias estimation coefficient (or power estimation coefficient) can reflect a fast-changing environment and a small bias estimation coefficient (or power estimation coefficient) can reflect a slow-changing environment. In some embodiments, these coefficients each has a range between 0 and 1. In some embodiments, a fast-changing environment corresponds to a bias estimation coefficient (or power estimation coefficient) having a value between 0.5 and 1, and a slow-changing environment corresponds to a bias estimation coefficient (or power estimation coefficient) having a value between 0 and 0.5.

Estimated noise value calculation unit 234 may be configured to determine an estimated noise value (e.g., the estimated DC bias and/or estimated noise power respectively) based on the bias estimation coefficient and/or the power estimation coefficient, and noise data contained in received signal 218. In some embodiments, estimated noise value calculation unit 234 may continuously update the estimated noise value as noise data in the next time window is received. For example, the estimated noise value of an immediately past time window may be aggregated with an instant noise value determined for the current time window, to derive an updated estimated noise value. By sequentially updating the estimated noise value using data from the past time windows and data from the current time window, estimated noise value calculation unit 234 is able to estimate the LiDAR noise in real-time.

Detection threshold determining unit 236 may be configured to update a detection threshold based on the estimated DC bias or the estimated noise power on a real-time basis. In some embodiments, a "detection threshold" is the lowest intensity of the returned laser beam system 102 can detect/measure. The detection threshold can be a function of the DC bias and/or the noise power of system 102. In some embodiments, the detection threshold is applied after a matched filtering of the received data. In some embodiments, the detection threshold can be estimated and updated based on the estimated DC bias and/or estimated noise power, so the returned laser beam can be detected/measured in a changing environment.

Returned laser beam processing unit 238 may be configured to determine the signal (e.g., amplitude and/or power) of the returned laser beam by removing/reducing the noise data from received signal 218 on a real-time basis. In some embodiments, the returned laser beam signal may be filtered according to a detection threshold determined based on the level of the estimated noise. In an example, return laser beam processing unit 238 may filter the amplitude and power of returned laser beam signal that is lower than the detection threshold.

Units 232-238 (and any corresponding sub-modules or sub-units) can be hardware units (e.g., portions of an integrated circuit) of processor 230 designed for use with other components or software units implemented by processor 230 through executing at least part of a program. The program may be stored on a computer-readable medium, and when executed by processor 230, it may perform one or more functions or operations. Although FIG. 2B shows units 232-238 all within one processor 230, it is contemplated that these units may be distributed among multiple processors located near or remotely with each other.

Memory 240 and storage 242 may include any appropriate type of mass storage provided to store any type of information that processor 230 may need to operate. Memory 240 and/or storage 242 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 240 and/or storage 242 may be configured to store one or more computer programs that may be executed by processor 230 to perform functions disclosed herein. For example, memory 240 and/or storage 242 may be configured to store program(s) that may be executed by processor 230 to analyze LiDAR signals.

Memory 240 and/or storage 242 may be further configured to store/cache information and data received and/or used by processor 230. For instance, memory 240 and/or storage 242 may be configured to store/cache received signal 218, training data 222, and calculation results obtained by different units of processor 230. The various types of data may be stored permanently, removed periodically, or disregarded immediately after each frame of data is processed.

Figure 3:
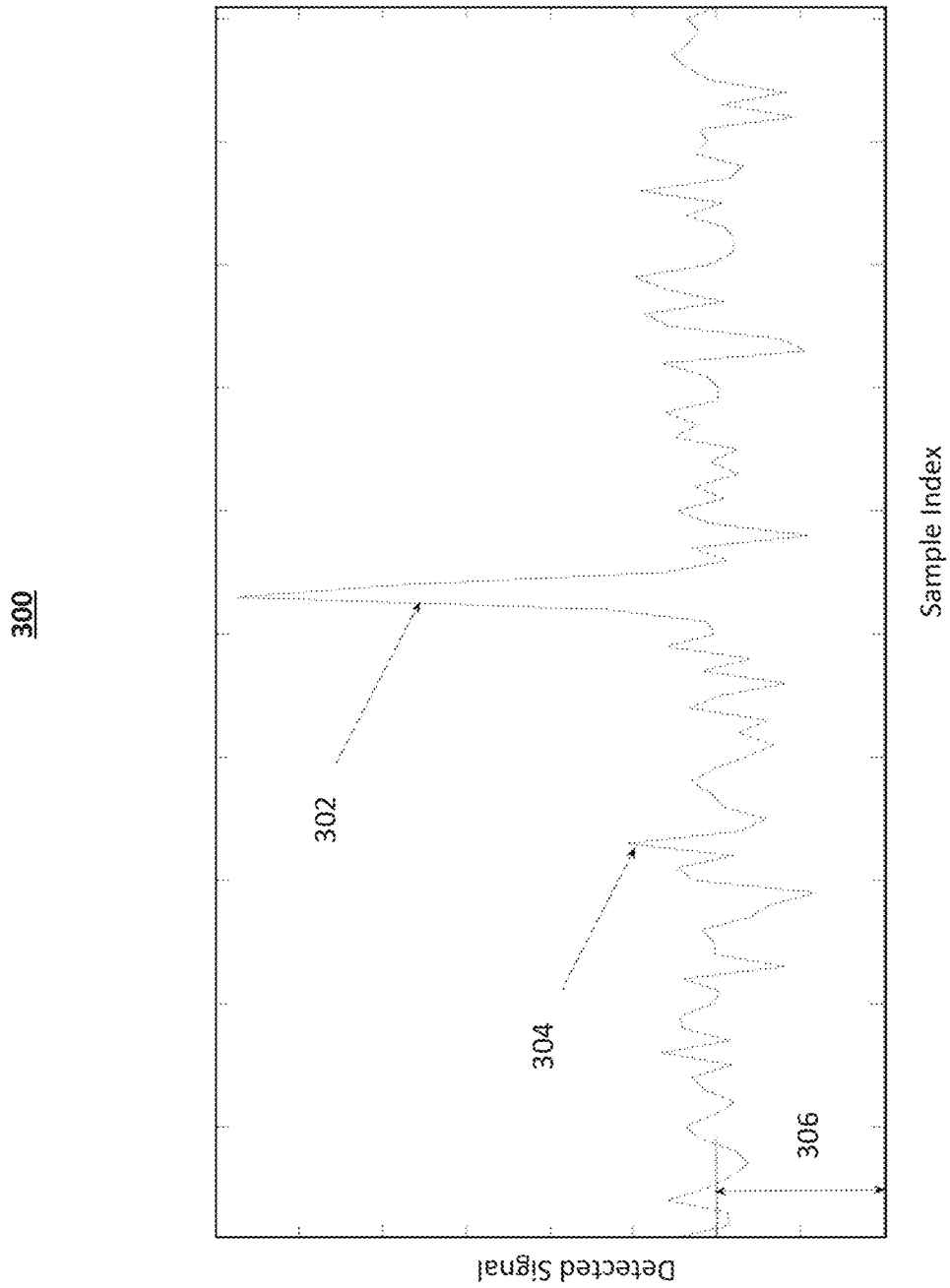
FIG. 3 illustrates an example of detected signal and noise intensities as a function of sample index, according to embodiments of the disclosure.

FIG. 3 illustrates an exemplary chart 300 of detected signal voltage (or current) intensities (e.g., detected by receiver 204 or received by controller 252) as a function of sample index. As shown in FIG. 3, signals detected by receiver 204 (e.g., received signal 218) can include returned laser beam signal 302 and noise signal 304 (also referred to as noise data 304). Consistent with the present disclosure, DC bias 306 (as labeled in FIG. 3) is the amplitude of noise signal 304, and noise power is (or proportional to) the variance of noise signal 304 (not labeled in FIG. 3). Noise power can represent the power generated by the noise signal 304.

To determine parameters (such as amplitude and power) of returned laser beam signal 302, controller 252 may need to determine a DC bias value and a noise power value of noise signal 304. For example, when the amplitude of received signal 218 is higher than the detection threshold, controller 252 can detect it as returned laser beam signal 302. When the amplitude of received signal 218 is approximately equal to or smaller than the detection threshold, controller 252 may not accurately or effectively determine whether it is part of returned laser beam signal 302 or it is noise signal 304. In other words, the detection threshold is a value that allows controller 252 to extract returned laser beam signal 302 from received signal 218. Similarly, the detection threshold also allows controller 252 to accurately determine the power of returned laser beam signal 302. Because noise signal 304 can change/fluctuate, e.g., as vehicle 100 moves around, it is important to determine the detection threshold in real-time to allow controller 252 to more accurately determine the amplitude and/or power of returned laser beam signal 302. Other than applying the thresholding to the raw received data directly, in some embodiment, the received data (signal and noise together) will be processed by a filter, such as a matched filter. The filter output will both depend upon the signal and noise. Then a threshold is applied to the filter output. The estimation of noise DC bias and power will be applied to determine a suitable threshold to the filter output to perform detection work and help in maintaining certain probability of false alarm (PFA) and probability of detection (PD). More specifically, the DC bias will first be subtracted from the raw received data and the estimated noise power will be used in computing a thresholding that applies after the filter (e.g. matched filter).

As used herein, an "estimated noise value" may be an estimated DC bias or an estimated noise power. An "estimated noise value" of a time window is determined using noise data received prior to that time window. For example, an estimated noise value of a second time window is determined using noise data received in the first time window and the second time window. "Past estimated DC bias," "past estimated noise power," or the like refer to the estimated DC bias and estimated noise power calculated for a time window immediately past the present time window. As used herein, an "instant noise value" may be an instant DC bias or an instant noise power." An "instant noise value" of a time window is determined using only the noise data received in that particular time window. For example, an instant noise value of a second time window is determined using noise data received in just the second time window.

The present disclosure provides systems and methods to determine the estimated noise value of a LiDAR system with improved accuracy and efficiency in real-time. The estimated noise value of a LiDAR system includes estimated DC bias and estimated noise power of the LiDAR system. The present disclosure provides methods to optimize the amount of available noise data (e.g., lengths of noise data) used in the computation of estimated DC bias and estimated noise power, so computation speed can be improved. The estimated DC bias and/or estimated noise power can be employed to calculate the detection threshold of the LiDAR system, which can be used to extract the returned laser beam signal from the received signal (e.g., by filtering out the noise from received signal 218). The returned laser beam signal can then be determined more accurately and more efficiently on a real-time basis.

In some embodiments, a sequential computation is performed to incorporate past estimated noise values (e.g., past estimated DC bias/noise power) into the estimation of current noise values (e.g., current DC bias/noise power). In some embodiments, the estimated noise values for the current time window may be a weighted sum of the past estimated noise value and the instant noise value of the current time window. The controller can control the weightings based on the environment (e.g., reflected by the noise data received by the controller) the vehicle is in. By controlling the weightings, the impact of noise caused by previous environment can be effectively controlled. In an example, the controller can calculate the estimated DC bias/noise power of a current time window using the instant DC bias/noise power of the current time window and the past estimated DC bias/noise power of the time window that is immediately prior to the current time window. Stated differently, the estimated DC bias/noise power of the current time window can be incorporated into the estimation of DC bias/noise power of the time window that is immediately subsequent the current time window. Because the past estimated DC bias/noise power is pre-calculated and the controller only needs to calculate the instant DC bias/noise power for the current time window, the computing load of the controller is minimal. Accordingly, real-time estimation of the noise caused by current environment is made possible. Thus, the detection threshold can be more accurately estimated, and the returned laser beam signal can be extracted with improved accuracy and efficiency.

Figure 4:
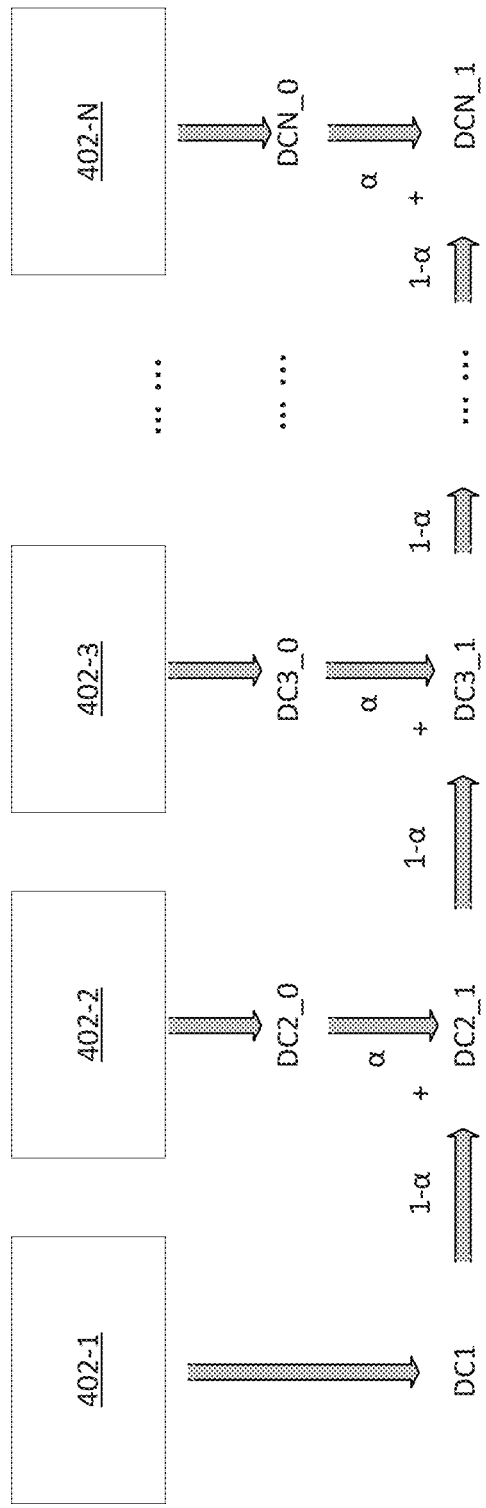
FIG. 4 illustrates an exemplary data flow for estimating dc bias, according to embodiments of the disclosure.

FIG. 4 illustrates an exemplary data flow 400 of the estimation of the DC bias of noise data, according to embodiments of the present disclosure. In some embodiments, as shown in FIG. 4, controller 252 receives a data frame sequentially over N time windows (e.g., time windows 402-1, 402-2, 402-3, . . . , 402-N (N being a positive integer)) and estimates the DC bias of noise data (e.g., noise data 304) of each time window based on the instant DC bias of the current time window and the past estimated DC bias of previous time windows. In some embodiments, controller 252 determines the length of each time window before receiving noise data. Controller 252 may calculate an estimated DC bias of a past time window, and calculate an estimated DC bias of the current time window immediately subsequent to the past time window by aggregating the estimated DC bias of the past time window and the instant DC bias of the current time window. In some embodiments, controller 252 calculates the estimated DC bias of the current time window before receiving noise data of a next time window that is immediately subsequent to the current time window.

For each data frame, controller 252 may start receiving noise data in a first time window (e.g., time window 402-1). Controller 252 may calculate/measure the instant DC bias of time window 402-1 (e.g., denoted as DC1) based on the noise data of time window 402-1. In some embodiments, when controller 252 receives noise data of a second time window (e.g., time window 402-2), controller 252 calculates the instant DC bias of time window 402-2 (e.g., denoted as DC2_0) based on the noise data of time window 402-2. Controller 252 may further perform an estimation of the DC bias of time window 402-2 by incorporating the instant DC bias of the previous time window (e.g., DC1) to obtain estimated DC bias of time window 402-2, which is denoted as DC2_1. In some embodiments, controller 252 obtains DC2_1 by DC2_1=α×DC2_0+(1−α)×DC1. In some embodiments, a represents a bias estimation coefficient and ranges from 0 to 1. For example, bias estimation coefficient α can be 0, 0.1, 0.3, 0.5, 0.8, 1, or any other value between 0 and 1. Bias estimation coefficient α can be trained using, e.g., training data 222, and can reflect the importance of the instant DC bias based on the current environment (e.g., being suitable for the current environment vehicle 100 is in). Accordingly, coefficient α can be used as a weighting for the instant DC bias. (1−α) can be used as a weighting for the past estimated DC bias.

Further, when controller 252 receives noise data of a third time window (e.g., time window 402-3), controller 252 may calculate the instant DC bias of time window 402-3 (e.g., denoted as DC3_0) based on the noise data of time window 402-3. Controller 252 may further calculate the estimated DC bias (e.g., DC3_1) of time window 402-3 by incorporating the estimated DC bias of the previous time window (e.g., DC2_1). In some embodiments, controller 252 obtains DC3_1 by DC3_1=α×DC3_0+(1-a)×DC2_1. Similarly, when controller 252 receives noise data of time window 402-N, controller 252 can calculate estimated DC bias DCN_1 by DCN_1=α×DCN_0+(1−α)×DC(N−1)_1, where DCN_0 represents the instant DC bias of time window 402-N and DC(N−1)_1 represents the estimated DC bias of time window (N−1).

In some embodiments, α can maintain a constant value over the N time windows. In some embodiments, α can vary over N time windows. The value of α can be determined by controller 252 through, e.g., training of previously collected noise data. In some embodiments, in the calculation of the estimated DC bias, α reflects the weighting of the current noise level (e.g., cause by the environment of vehicle 100 when the noise data of the current time window is recorded) and (1−α) reflects the weighting of the past noise level. As shown in equations for the calculation of estimated DC biases (e.g., DC2_1), α greater a can result in a greater weighting of instant DC bias of the current time window (e.g., DC2_0) and a smaller weighting of past computed DC bias (e.g., DC1), and vice versa.

Controller 252 may determine the value of α based on training data 222 and/or detection results collected from other sensors (e.g., temperature sensor, humidity sensor, and/or any other sensors mounted on vehicle 100 that can detect the environment in real time). In various embodiments, α may be constant or may vary over the N time windows. For example, α can be constant over the entire N time windows, constant over some of the N time windows, or change its value in each of the N time windows. In some embodiments, if controller 252 determines the DC bias of the current time window fluctuates quickly (e.g., caused by fast-changing environment), controller 252 determines α to have a greater value, such as 0.9. The DC bias caused by the current environment may then have a greater impact on the estimated DC bias of the current time window compared to the DC bias caused by past environment (e.g., environment vehicle 100 is in at past time windows). For example, the fluctuation may be measured within a time window or among the time windows. For example, the fluctuation may be measured by a difference between noise data and a baseline (e.g., determined by controller 252). The baseline may be a noise value that indicates the trend of the noise data. The fluctuation frequency of the noise data represents the times the noise data varies about the baseline. In some embodiments, if controller 252 determines the DC bias of the current time window fluctuates slowly (e.g., caused by a slow-changing environment), controller 252 determines α to have a smaller value, such as 0.1. The DC bias caused by the current environment may then have a smaller impact on the estimated DC bias of the current time window compared to the DC bias caused by past environment. In some embodiments, when controller 252 determines that α is equal to 1, past computed DC biases have little or no impact on the estimated DC bias of the current time window.

The values of the instant DC biases of the time windows (e.g., DC1, DC2_0, DC3_0, . . . , and DCN_0) can be obtained by any suitable means when controller 252 receives the noise data of respective time window (e.g., 402-1, 402-2, . . . , and 402-N) and/or the noise data of respective time window is available for computation. In some embodiments, the values of the instant DC biases are calculated by averaging the received noise data in the time window. For example, DC1 is equal to the average of noise data of time window 402-1, DC2_0 is equal to the average of noise data of time window 402-2, DC3_0 is equal to the average of noise data of time window 402-3, . . . , DCN_0 is equal to the average of noise data of time window 402-N. In an example, the noise data of time windows 402-1, 402-2, 402-3, . . . , 402-N can be represented by X1, X2, X3, . . . , XN, and the instant DC biases of each respective time window can be equal to mean (X1), mean (X2), mean (X3), . . . , mean (XN). Controller 252 can then obtain the estimated DC bias of each time window by aggregating the past computed DC bias and the instant DC bias weighted bias estimation coefficient α as described above.

Figure 5:
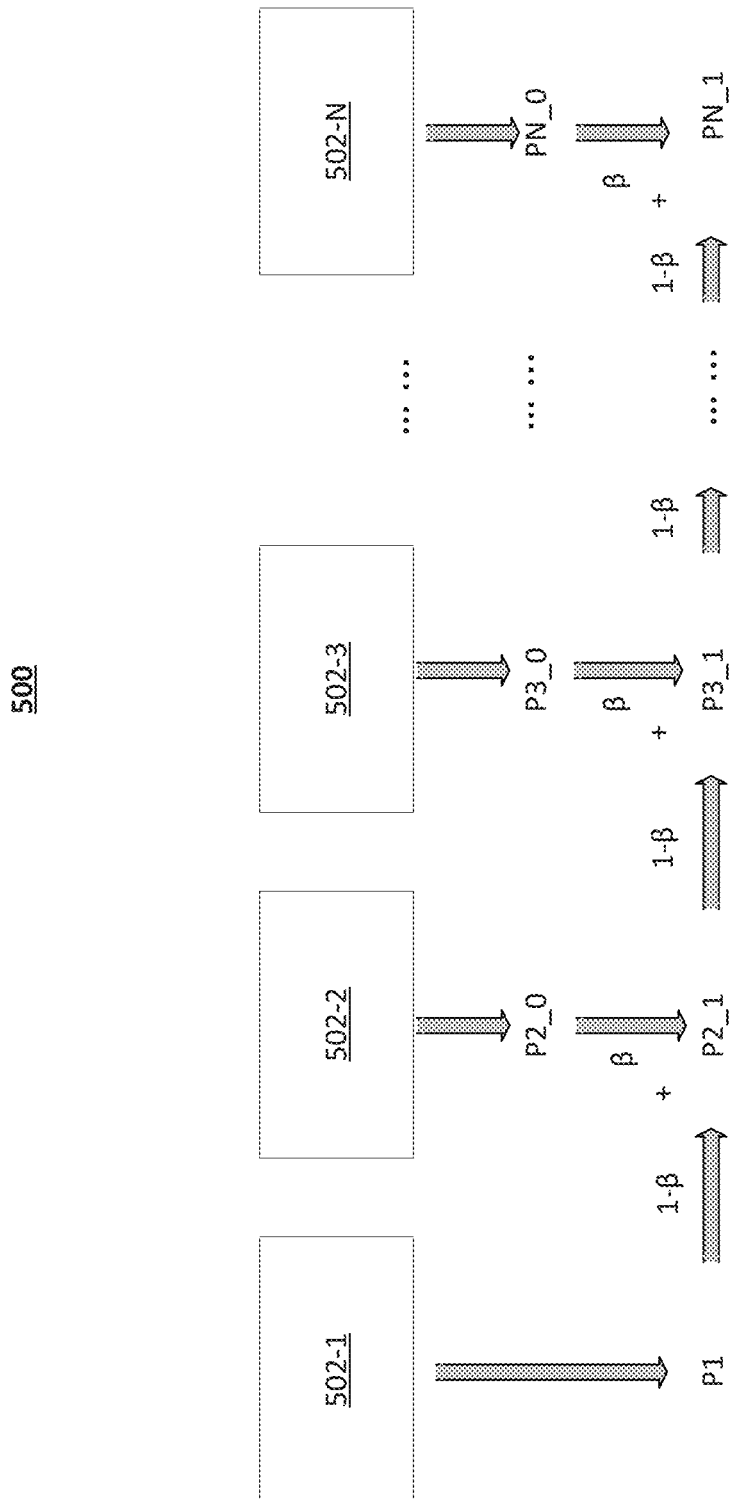
FIG. 5 illustrates an exemplary data flow for estimating noise power, according to embodiments of the disclosure.

FIG. 5 illustrates an exemplary data flow 500 for estimation of the noise power, according to embodiments of the disclosure. Similar to data flow 400, controller 252 receives the noise data over N time windows (e.g., 502-1, 502-2, 502-3, ..., 502-N), sequentially calculate the instant noise power of each time window (e.g., P1, P2_0, P3_0, ..., PN_0), and sequentially calculate the estimated noise power of time windows 502-1 to 502-N (e.g., P2_1, P3_1, ..., PN_1). To obtain the estimated noise power, controller 252 can incorporate past computed noise power when performing the estimation of noise power of current time window. Similar to data flow 400, in data flow 500, controller 252 may obtain the estimated noise power of a time window before receiving the noise data of an immediately subsequent time window. In some embodiments, controller 252 controls the weighting of instant noise power in the estimation of noise power in the current time window by using power estimation coefficient β. The range and application scenarios of power estimation coefficient β can be similar to bias estimation coefficient α and can be referred to the description of FIG. 4.

Different from data flow 400, in data flow 500, the instant noise power of each time window 502-1, 502-2, ..., 502-N (N being a positive integer) can be calculated as the variance of noise data of the respective time window. As examples, for time window 502-1, the instant noise power can be calculated as P1=var(X1). For time window 502-2, the instant noise power can be calculated as P2_0=var(X2). For time window 502-3, the instant noise power can be calculated as P3_0=var(X3). For time window 502-N, the instant noise power can be calculated as PN_0=var(XN). The estimated noise power of time windows 502-2 to 502-N can respectively be calculated as P2_1=β×P2_0+(1−β)×P1, P3_1=β×P3_0+(1−β)×P2_1, ..., and PN_1=β×PN_0+(1−β)×P(N−1)_1.

Similar to bias estimation coefficient α, the range and application scenarios of power estimation coefficient β can be determined from training data 222. For example, β can range from 0 to 1. In some embodiments, β can be any suitable value between 0 and 1, such as 0, 0.1, 0.3, 0.5, 0.8, or any other value suitable for the environment condition of the respective time window. Detailed descriptions of the application scenarios and advantages of using power estimation coefficient β are similar to those of bias estimation coefficient α, and therefore are not repeated.

Figure 6:
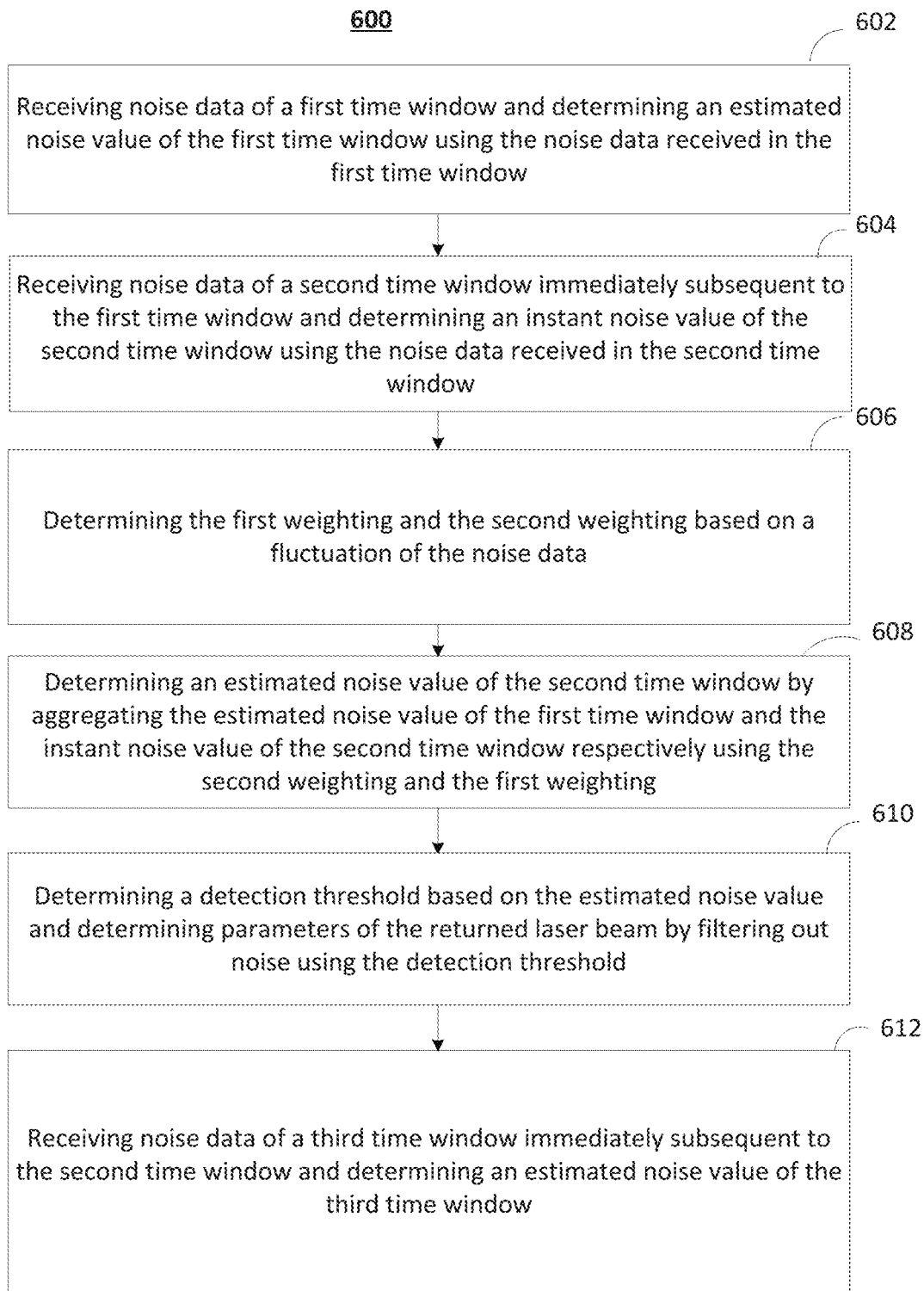
FIG. 6 illustrates a flow chart of an exemplary method to calculate estimated DC bias/noise power, according to embodiments of the disclosure.

FIG. 6 illustrates a flow chart of an exemplary method 600 to calculate estimated DC bias/noise power of noise data, according to some embodiments. The operations performed by controller 252, as described below, may also be performed partially or totally by a remote server.

At step 602, controller 252 may receive noise data of a first time window transmitted by receiver 204 and determine an estimated noise value of the first time window using the noise data received in the first time window. In some embodiments, the noise data is collected by photodetector 216 and transmitted to controller 252 in real-time. The noise data can be in the form of electric current and/or voltages outputted by photodetector 216 and can include noise caused by environment such as weather, background light, temperature, etc. In some embodiments, controller 252 receives training data 222 (e.g., from a survey devices 220) and determines bias estimation coefficient α and/or power estimation coefficient β based on the training data (e.g., by estimation coefficient determining unit 232).

Controller 252 may calculate the estimated DC bias and estimated noise power of the first time window. In some embodiments, estimated noise value calculation unit 234 may perform the calculation. When the first time window is the very first time window of a respective data frame, the estimated DC bias/noise power of the first time window may be equal to an instant DC bias/noise power of the first time window. In some embodiments, the instant DC bias of the first time window is calculated as the mean value of the noise data of the first time window, and the instant noise power is calculated as the variance of the noise data of the first time window.

In step 604, controller 252 may receive noise data of a second time window immediately subsequent to the first time window and determine an instant noise value of the second time window using the noise data received in the second time window. In some embodiments, the instant noise value of the second time window includes an instant DC bias and/or an instant noise power of the second time window. Details of the computing of the instant DC bias/noise power can be referred to the description of FIGS. 4 and 5 and are not repeated herein.

In step 606, controller 252 may determine a fluctuation of the noise data, and dynamically determines values of a first weighting and a second weighting based on the fluctuation. For example, if the estimated noise value is an estimated DC bias, the first weighting is denoted as α and the second weighting is denoted as (1−α). If the estimated noise value is an estimated noise power, the first weighting is denoted as β and the second weighting is denoted as (1−β). Details of the calculation of the weightings can be found in the descriptions of FIGS. 4 and 5 and are not repeated herein.

In step 608, controller 252 may determine an estimated noise value of the second time window by aggregating the estimated noise value of the first time window and the instant noise value of the second time window by respectively using the second weighting and the first weighting.

For example, if the estimated noise value is an estimated DC bias (e.g., DC2_1), the estimated noise value may be calculated as a sum of the instant DC bias of the second time window (e.g., DC2_0) weighted by the first weighting (e.g., α) and the estimated DC bias of the first time window (e.g., DC1) weighted by the second weighting (e.g., (1−α)). If the estimated noise value is an estimated noise power (e.g., P2_1), the estimated noise value may be calculated as a sum of the instant noise power of the second time window (e.g., P2_0) weighted by the first weighting (e.g., β) and the estimated noise power of the first time window (e.g., P1) weighted by the second weighting (e.g., (1−β)).

In step 610, controller 252 may determine a detection threshold based on the estimated noise value and determining parameters of a returned laser beam by filtering out noise using the detection threshold. The detection threshold may be the lowest intensity of the returned laser signal controller 252 can detect and measure. The detection threshold may be a function of noise of system 102 and can be estimated using the estimated noise value. In some embodiments, controller 252 updates the detection threshold based on the estimated noise value of the second time window before receiving noise data of subsequent time windows. Controller 252 can then use the updated detection threshold to filter out noise in the received signal 218 to detect the returned laser beam signal and perform necessary data processing to obtain parameters of the returned laser beam signal.

In step 612, controller 252 may receive noise data of a third time window immediately subsequent to the second time window, dynamically adjusting the first weighting and the second weighting based on the fluctuation of noise data received in the third time window and the second time window, determining an estimated noise value of the third time window using the noise data received in the third time window and the estimated noise value of the second time window respectively using the second weighting and the first weighting, determining a detection threshold based on the estimated noise value, and determining parameters of the returned laser beam by filtering out noise using the detection threshold. Similar to the operations described in steps 602 and 604, controller 252 may continue to receive noise data of third time window and determine the estimated noise value of the third time window. The determining of the estimated noise value of the third time window, the determining of the detection threshold, and parameters of the returned laser beam may also be similar to the operations described in steps 602-610, and therefore are not repeated.

Controller 252 may continue to receive noise data of one or more time windows, and sequentially calculate the estimated noise value of the one or more time windows, as described in steps 602-612. In some embodiments, controller 252 calculates the estimated noise value of a time window before receiving the noise data of the immediately subsequent time window. In some embodiments, controller 252 may receive noise data of N time windows in a data frame. N can be any suitable positive integer. In some embodiments, controller 252 determines the value of N. N may be the same or different in different data frames. Controller 252 may determine the length of a time window and value of N in each data frame. The lengths of time windows may be the same as each other or may be different from one another. In some embodiments, N may be in a range of 5 to 100, and the length of a time window may be between 1 microsecond to 1 second. The specific values of N and lengths of time windows should be determined based on, e.g., the computability of controller 252, the amount of noise data received in each time window, and/or frequency to update the detection threshold, and should not be limited by the embodiments of the present disclosure.

Controller 252 may continuously update the detection threshold based on the estimated DC bias and/or the estimated noise power for the measurement of returned laser beam before receiving the noise data of the immediately subsequent time window. In some embodiments, the updating process is performed in real-time. For example, controller 252 may continuously update the detection threshold when a new estimated DC bias/noise power is calculated. In some embodiments, controller 252 updates the detection threshold N times in a data frame (e.g., using N estimated DC biases and N estimated noise power of N time windows). In some embodiments, controller 252 updates less than N times in a data frame (e.g., using a portion of N estimated DC biases and N estimated noise power of N time windows). In some embodiments, controller 252 determines the parameters of the returned laser beam signal based on the updated detection threshold for N times in a data frame. The specific frequency N of updates per data frame should be determined based on, e.g., the computability of controller 252, and should not be limited by the embodiments of the present disclosure.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for analyzing noise data for light detection and ranging (LiDAR), comprising:
   a LiDAR receiver configured to sequentially receive noise data of the LiDAR in a plurality of time windows; and
   a LiDAR controller configured to:
   determine a first noise value of a first time window using the noise data received in the first time window;
   determine a second noise value of a second time window using the noise data received in the second time window, wherein the second time window is immediately subsequent to the first time window;
   determine a first weighting for the first noise value of the first time window and a second weighting for the second noise value of the second time window;
   determine an estimated noise value of the second time window by aggregating the first noise value of the first time window and the second noise value of the second time window based on the first weighting and the second weighting; and
   dynamically adjusting the first weighting and the second weighting.

2. The system of claim 1, wherein the estimated noise value of the second time window is determined in real-time prior to receiving the noise data in a third time window immediately subsequent to the second time window.

3. The system of claim 2, wherein the operations further comprises:
   determining a third noise value using noise data received in the third time window; and
   determining an estimated noise value of the third time window by aggregating the estimated noise value of the second time window and the third noise value of the third time window.

4. The system of claim 1, wherein a sum of the first weighting and the second weighting is equal to 1.

5. The system of claim 4, wherein determining the estimated noise value of the second time window further comprises calculating a sum of the second noise value of the second time window weighted by the second weighting and the first noise value of the first time window weighted by the first weighting.

6. The system of claim 4, wherein the first weighting and the second weighting are dynamically adjusted based on a fluctuation in the noise data.

7. The system of claim 6, wherein the second weighting is increased in response to a larger fluctuation in the noise data.

8. The system of claim 1, wherein the first noise value of the first time window is an estimated direct current (DC) bias determined as a mean of the noise data received in the first time window.

9. The system of claim 1, wherein the first noise value of the first time window is an estimated noise power of the first time window determined as a variance of the noise data received in the first time window.

10. The system of claim 1, wherein the operations further comprise:
   determining a detection threshold based on the noise data;
   receiving a laser beam signal coupled with the noise data; and
   determining parameters of the laser beam signal by filtering out noise using the detection threshold.

11. A method for analyzing noise data for light detection and ranging (LiDAR), comprising:
   determining, by a LiDAR controller, a first noise value of a first time window using noise data received by a LiDAR receiver in the first time window;
   determining, by the LiDAR controller, a second noise value of a second time window using noise data received by the LiDAR receiver in the second time window, wherein the second time window is immediately subsequent to the first time window;
   determining, by the LiDAR controller, a first weighting for the first noise value of the first time window and a second weighting for the second noise value of the second time window;
   determining, by the LiDAR controller, an estimated noise value of the second time window by aggregating the first noise value of the first time window and the second noise value of the second time window based on the first weighting and the second weighting; and
   dynamically adjusting, by the LiDAR controller, the first weighting and the second weighting.

12. The method of claim 11, further comprising determining the estimated noise value of the second time window in real-time prior to receiving the noise data in a third time window immediately subsequent to the second time window.

13. The method of method 12, further comprising:
   determining a third noise value using noise data received by the LiDAR receiver in the third time window; and
   determining an estimated noise value of the third time window by aggregating the estimated noise value of the second time window and the third noise value of the third time window.

14. The method of claim 11, wherein a sum of the first weighting and the second weighting is equal to 1.

15. The method of claim 14, wherein determining the estimated noise value of the second time window further comprises calculating a sum of the second noise value of the second time window weighted by the second weighting and the first noise value of the first time window weighted by the first weighting.

16. The method of claim 14, wherein the first weighting and the second weighting are dynamically adjusted based on a fluctuation in the noise data.

17. The method of claim 16, further comprising increasing the second weighting in response to a larger fluctuation in the noise data.

18. The method of claim 11, wherein the first noise value of the first time window is an estimated direct current (DC) bias determined as a mean of the noise data received in the first time window or an estimated noise power determined as a variance of the noise data received in the first time window.

19. A non-transitory computer-readable medium having instructions stored thereon, wherein the instructions, when executed by a light detection and ranging (LiDAR) controller, cause the LiDAR controller to perform a method for analyzing noise data for LiDAR, the method comprising:
   determining a first noise value of a first time window using noise data received in the first time window;
   determining a second noise value of a second time window using noise data received in the second time window, wherein the second time window is immediately subsequent to the first time window;
   determining a first weighting for the first noise value of the first time window and a second weighting for the second noise value of the second time window;
   determining an estimated noise value of the second time window by aggregating the first noise value of the first time window and the second noise value of the second time window based on the first weighting and the second weighting; and
   dynamically adjusting the first weighting and the second weighting.

20. The non-transitory computer-readable medium of claim 19, wherein the method further comprises determining the estimated noise value of the second time window in real-time prior to receiving the noise data in a third time window immediately subsequent to the second time window.

* * * * *